United States Patent [19]

Ireland

[11] 4,143,907
[45] Mar. 13, 1979

[54] ROOF MEANS FOR VEHICLES

[75] Inventor: Alfred L. Ireland, Wolverhampton, England

[73] Assignee: Edward Rose (Birmingham) Limited, England

[21] Appl. No.: 719,726

[22] Filed: Sep. 2, 1976

[51] Int. Cl.² ............................................. B60J 7/06
[52] U.S. Cl. ............................. 296/137 C; 160/84 R
[58] Field of Search .......... 296/137 C, 137 D, 137 A, 296/137 G, 137 H, 105, 109; 160/84 R, 383, 385, 386, 388; 135/15 CF, 15 PQ

[56] References Cited

U.S. PATENT DOCUMENTS

| | | | |
|---|---|---|---|
| 1,741,946 | 12/1929 | Markee | 296/137 A |
| 3,028,194 | 4/1962 | Werner | 296/137 C |
| 3,201,171 | 8/1965 | Wickard | 296/105 X |
| 3,666,318 | 5/1972 | Butler | 296/137 C |

FOREIGN PATENT DOCUMENTS

| | | | |
|---|---|---|---|
| 201483 | 5/1939 | Switzerland | 296/137 D |

Primary Examiner—Robert B. Reeves
Assistant Examiner—Michael J. Forman
Attorney, Agent, or Firm—Ostrolenk, Faber, Gerb & Soffen

[57] ABSTRACT

An opening roof for an automobile, and a method of producing same, the roof comprising an outer cover of a flexible sheet material supported by a number of cross members, and an inner lining of a flexible sheet material extending beneath the cross members. The cross members extend through open-ended tubular pockets attached directly to the cover and connected by integral flaps to the lining. Each pocket and its flap are formed from a strip of a flexible material welded along a first longitudinal central line to the cover, the two portions at opposite sides of said line being stitched together along second lines spaced from said first line to form the pocket and being stitched to the lining along third lines adjacent to the side edges of the strip and spaced from said second lines. The ends of each cross member are received in pockets formed by attaching pieces of a flexible material to the sides of the cover.

8 Claims, 4 Drawing Figures

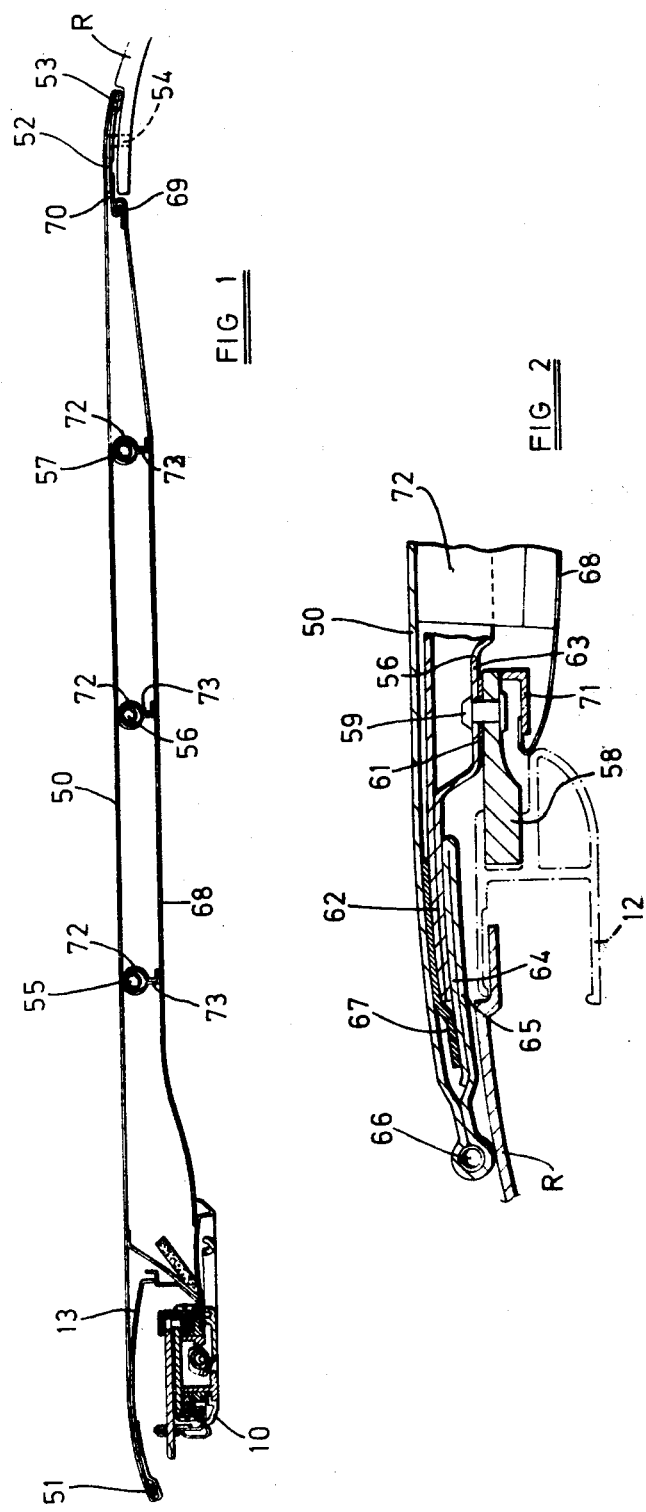

ROOF MEANS FOR VEHICLES

BACKGROUND OF THE INVENTION

1. Field of the Invention

This invention relates to the manufacture of roof means for, automobiles, and of the kind comprising an outer cover of a flexible sheet material which is supported by a number of cross members, and an inner lining also of a flexible sheet material which extends beneath the cross members.

In particular the invention is concerned with a folding roof means of the kind, herinafter referred to as the kind specified, in which the cross members extend transversely of an opening formed in the roof of the automobile and are movable longitudinally of the opening between a position in which the cover and the lining are extended and close the opening, and a position in which the cover and the lining are collapsed, for example folded in zig-zag fashion, so that the opening is open.

2. Description of the Prior Art

A problem which arises with a conventional folding roof when it is closed and particularly when the automobile is travelling at a high speed, is that the outer cover may be lifted by the wind and the air flow over the vehicle so that it balloons up, with the result that its sides are drawn inwards towards one another and this produces draughts in the vehicle and the roof leaks in wet weather.

The object of the present invention is to provide an improved method of manufacturing folding a roof means of the kind specified which in particular eliminate the aforementioned problem.

SUMMARY OF THE INVENTION

According to a first aspect of the invention we provide a method of manufacturing a roof means of the kind specified which includes, for at least one of the cross members, the steps of attaching a strip of flexible material to the inner face of the cover along a first attachment line extending longitudinally of the strip intermediate its side edges, securing together the two portions of the strip which extend from opposite sides of said first attachment line, along second attachment lines extending longitudinally of the strip at a spacing from its side edges thereby to form the strip into a tube having two longitudinally extending flaps formed by the free portions of the strip extending from said second attachment lines, and attaching said flaps to the inner face of the lining about third attachment lines extending longitudinally of the strip at or adjacent to its side edges, the said tube being formed to receive the cross member whereby both the cover and the lining are connected to the cross member.

Preferably the cover and the lining are connected to all the cross members of the roof means by a strip of flexible material in this manner.

Thus, when the roof means is assembled, the cross members are received in open-ended tubular pockets formed by the strips of flexible material and the outer cover is secured direct to these pockets so that, in the case for example of a folding roof, the cover is maintained taut and prevented from ballooning up when the roof is closed. The lining is also attached direct to the tubular pockets by the flaps, which extend downwardly from the pockets, so that, in the case for example of a folding roof, the flaps whilst preventing the lining sagging when the roof is closed, nevertheless permit some movement of the lining relative to the cross members which is necessary on opening and closing of the roof.

The cover will usually be made of a plastics or plastics-coated sheet material, for example polyvinylchloride-coated leathercloth, and it is intended that the or each strip shall also be of a plastics or plastics-coated material. In this event the or each strip is preferably attached to the cover along said first attachment line thereof by high frequency welding. In this regard it is to be noted that this operation can be performed easily and quickly since an operative merely has to position the cover and the or each strip between the two electrodes of an electrical high frequency welding apparatus. It would not be possible to effect the attachment in this way if the cross member were in position since it would be in the way of the electrodes.

Securing together of the two portions of the or each strip along said second attachment lines is preferably effected by stitching. Preferably, also, the attachment of the lining to the flaps of the or each strip along said third attachment lines is effected by stitching.

Conveniently appropriate markings are provided on the cover, the lining and the or each strip to indicate the various attachment lines thereby to assist operatives performing the welding and stitching operations.

According to a second aspect of the invention we provide a roof means of the kind specified wherein the cover is attached at its inner surface directly to at least one transversely extending tubular pocket along a line extending longitudinally of the latter, the or each pocket being formed to receive a cross member, and the lining is connected to the or each pocket by a flap extending between the pocket and the lining, the flap being attached to the lining and joined to the pocket along a line extending longitudinally of the latter.

Preferably all the cross members of the roof means are received in tubular pockets as described.

The or each tubular pocket is preferably formed by a strip of flexible material attached to the cover and the lining in the manner described above.

Preferably the or each tubular pocket is open-ended and the ends of the cross member received therein project from the ends of the pocket and are received in pockets provided on the side edges of the cover whereby the cover is connected at its sides to the ends of the members. These pockets are preferably open-ended and each formed simply by attaching a piece of flexible material for example a plastics or plastics-coated sheet material, to the cover along two spaced lines so that the pocket is defined by the piece of material and the opposed part of the cover between said lines. Thus, the cover is not cut to form openings to receive the ends of the cross members as is the conventional practice, and the cover is not therefore weakened and susceptible to tearing where it is connected to the corss members.

Preferably, the pieces of material are attached to double thickness side portions of the cover formed by turning over the marginal edge portions of the cover.

BRIEF DESCRIPTION OF THE DRAWINGS

The invention will now be described by way of example with reference to the accompanying drawings in which:

FIG. 1 is a longitudinal section through one form of folding roof assembly which is fitted to an automobile and has been produced by the method according to the invention, FIG. 2 is a cross section through a side part of the assembly.

DESCRIPTION OF THE PREFERRED EMBODIMENTS

Figure 3:
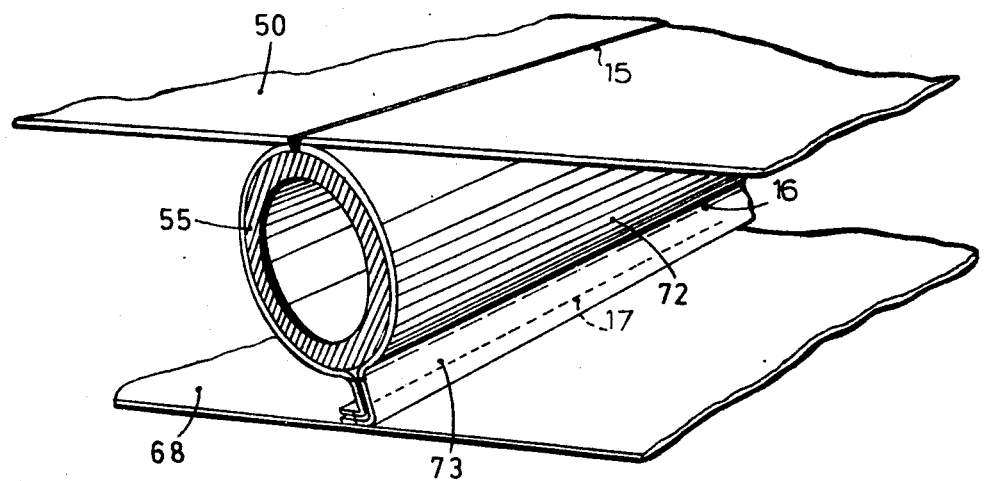
FIG. 3 is a diagrammatic part-sectional perspective view of part of the folding roof assembly.

The folding roof assembly illustrated in the drawings comprises opening and closing means including an elongate support plate 10 which extends transversely of a rectangular opening formed in the roof R of the automobile and has at its respective ends two slides 11 which are slidably engaged in two channel section guide members extending along and fixed to the parallel longitudinal sides of the opening whereby the support plate is movable between a forward position and a rearward position in the opening. One of the guide members is shown in chain-dotted lines at 12 in FIG. 2.

A flexible outer cover 50 of a suitable sheet material, for example leather cloth coated on both sides with polyvinylchloride, is attached at its front end to an elongate cover plate 13 carried by the support plate 10 and forming part of the opening and closing means, and at its rear end to the rear end of the opening in the roof R. The front end portion of the cover 50 extends over the upper face of the cover plate 13, is turned back around a foam plastics strip 51 and extends beneath the under face of the cover plate to which it is adhered. The rear end portion of the cover 50 extends over the upper face of a transverse elongate metal panel 52, is turned back around a foam plastics strip 53 and extends beneath the under face of the panel to which it is adhered. The panel 52 has a number of spaced depending spigots 54 one of which is seen in FIG. 1 and which extend into and are fixed in bores in the roof R.

The cover 50 is supported by three tubular metal cross members 55, 56 and 57 extending transversely of the opening in the roof and parallel to the support plate 10. The member 56 (but not the members 55 and 57) is provided at its respective ends with two slides which are slidably engaged in the respective channel section guide members 12, one of the slides being shown at 58 in FIG. 2 secured by a rivet 59 to the member 56.

The cross member 55 is connected to the support plate 10 by two spring links secured to the respective ends of the cross member and to the respective ends of the support plate. The cross member 57 is likewise connected to the cross member 56 by two spring links, one of which is shown at 61 in FIG. 2 held by the rivet 59 between the slide 58 and the cross member 56.

All the cross members 55, 56 and 57 have completely flattened end portions 62 joined by partially flattened portions 63 to the main tubular parts of the members, the slides 58 of the member 56 being secured to the partially flattened portion 63 of this member as shown in FIG. 2. The sides of the cover 50 extend outwardly beyond the extremities of the cross members and, as shown in FIG. 2, each side portion 64 is turned over so that it lies flat against the adjacent portion 65 and the double thickness side margin thus formed is folded over beneath the relevant flattened end portions 62 of the cross members, a piping card 66 being incorporated in the fold. Each flattened end portion 62 of each cross member is received in a pocket 67 formed by attaching a piece of a flexible material such as leathercloth coated on both sides with polyvinylchloride to the relevant double thickness side margin of the cover along two spaced parallel lines at opposite sides of the end portion 62 and a transverse line at the extremity of said portion.

The roof assembly also has an inner lining 68 of a suitable sheet material, for example fabric, which extends beneath the tubular cross members 55, 56 and 57. This lining is attached at its front end to the support plate 10 and at its rear end to the panel 52. The front end portion of the lining extends beneath a foam plastics pad (not shown) secured to the under face of the support plate 10. The rear end portion of the lining is wrapped around a transverse piping cord 69, the cord and the portion of the lining extending around it being secured in a channel of a transverse plate 70 attached to the panel 52.

The side portions of the lining 68 are each turned upwardly and wrapped around, and stitched to a nylon tape so that when the roof is closed the side portions are maintained taut, and as shown in FIG. 2, disposed close to the channel section members 12. The slides 58 of the cross member 56 carry clips one of which is shown at 71 in FIG. 2 and which support the side portions of the lining.

The cross members 55, 56 and 57 extend through open ended tubular pockets 72. The cover 50 is attached directly to each of these pockets and the lining 68 is connected to each pocket by a flap 73 which is integral with and extends downwardly from the pocket and is attached to the lining. Each pocket 72 and its flap 73 are formed from a so-called listing strip of fabric coated on one or both sides with polyvinylchloride.

The opening and closing means including the support plate 10 and the cover plate 14 may be constructed as described and illustrated in the specification and drawings of co-pending U.S. patent application Ser. No. 719,727 filed Sept. 2, 1976.

The arrangement is that when the opening and closing means of the roof assembly is in its forward position with a latch member (not shown) carried thereby engaged with a latch plate mounted at the front end of the opening in the roof, the cross members 55, 56 and 57 are spaced from one another and the cover and the lining are stretched taut, as shown in FIG. 1, so that the cover completely closes the opening in the roof in a weatherproof fashion, the side edges of the cover being in sealing contact with the roof. When the opening and closing means is moved to its rearward position, the cross member 56 and the support plate 10 are closed up to one another and the cover 50 and the lining 68 are folded up in concertina fashion so that the roof opening is open. In the initial part of rearwards movement of the opening and closing means the spring links interconnecting the support plate 10 and the adjacent cross member 55 lift the latter so that on further rearwards movement of the opening and closing means the cross member moves to a position above the member 55. The spring links 61 interconnecting the cross members 56 and 57 then lift the member 57 so that as the support plate 10 and the cross member 56 continue their rearwards movement, the member 57 is pushed to a position above the rear end of the roof opening, the member 55 also being moved to this position. Thus, when the opening and closing means is in its rearmost position, the cross member 56 is disposed adjacent to the rear end of the opening and the opening and closing means is disposed close to it, and the cross members 55 and 57 are disposed close together above the rear end of the opening.

Referring particularly to FIG. 3, each pocket 72 and its flap 73 are formed from a listing strip by the following method which is described in relation to the pocket receiving the cross member 55.

The strip is marked with a first longitudinal attachment line mid-way between its side edges, two second longitudinal attachment lines at opposite sides of and spaced from the first line, these second lines being spaced from and at equal distances from the side edges of the strip, and two third longitudinal attachment lines spaced from the second lines and close to the respective side edges of the strip. The cover 50 is marked with a transverse line at the intended location of the cross member 55 and the lining 68 is likewise marked with a transverse line at the intended location of the cross member.

The strip is laid flat against the cover 50 with the first attachment line in register with the transverse line on the cover and the cover and strip are then positioned by an operative in an electrical high frequency welding apparatus which is operated to form along said marked lines a weld line 15 which attaches the strip to the cover.

The two portions of the strip extending from opposite sides of the weld line 15 are brought together with the two second attachment lines of the strip in register and are then stitched together along these lines by means of a sewing machine thereby to form a line of stitches 16. The strip is therefore formed to provide the open-ended tubular pocket 72 for receiving the cross member 55.

The two portions of the strip which are left projecting from the pocket 72 are placed against the lining 68 with the two third attachment lines of the strip in register with the transverse line on the lining and are then stitched to the lining along said lines by means of a sewing machine thereby to form a line of stitches 17 attaching the lining 68 to the flap 73 thus formed by the said strip portions.

Finally, the cross member 55 is inserted into the pocket 72.

The pocket 13 is formed so that the cross member 55 has a small degree of free movement within it, and the flap 73 is made of a constant depth along its length.

The various markings provided on the corner, the strip and the lining to assist the operatives performing the welding and stitching operations will all be made before the various parts are given to the operatives so that the welding and stitching operations can be performed easily and quickly.

Figure 4:
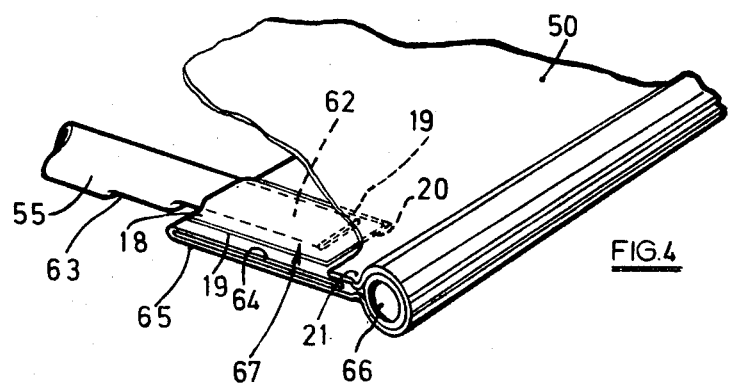
FIG. 4 is a diagrammatic perspective view, partly cut away, of another part of the assembly.

Referring particularly to FIG. 4, the pockets 67 for receiving the flattened end portions 62 of the cross members 55, 56 57 are each formed by the following method which is described in relation to the pocket receiving one end portion of the cross member 55.

As described above, the side edge portions 64 of the cover 50 is turned over so that it lies flat against the adjacent portion 65. To form each pocket 67 a piece 18 of a flexible material such as leathercloth coated on both sides with polyvinylchloride, i.e. the same material as that from which the cover is made, is attached by high frequency welding to the exposed face of the portion 64 along two spaced parallel lines 19 and a transverse line 20 so that the pocket is defined by the piece 18 and the part of the portion 64 between the weld lines 19. The weld lines 19 and 20 are formed so that they also pass through the portion 65 so that the two portions 64 and 65 are secured together at intervals along the relevant side of the cover.

The double thickness side margin formed by the portions 64 and 65 is then folded over so that it lies flat against the underside of the main part of the cover 50 which the pockets 67 between them. The piping cord 66 is incorporated in the fold and the portion 65 is attached to the main part of the cover by high frequency welding along a longitudinal weld line 21 inwardly of, and close to the piping cord so that the cover is formed with a beaded edge.

The flattened end portions 62 of the cross members 55, 56 and 57 are simply inserted into the pockets 67.

I claim:

1. A method of manufacturing a folding roof means for a vehicle having a roof formed with an opening therein, said roof means comprising an outer cover of a flexible sheet material that is comprised of a plastics material, the cover being supported by a number of cross members extending beneath and transversely with respect to the cover, an inner lining of a flexible sheet material which extends beneath the cross members, and means for mounting the roof means on the vehicle with the cross members extending transversely of the opening in the roof thereof and for movement longitudinally of the opening between a position in which the cover and the lining are extended and close the opening, and a position in which the cover and the lining are collapsed to that the opening is open, which method includes, for at least one of the cross members, the steps of attaching by welding a strip of a flexible material that is comprised of a plastics material, directly to the inner face of the cover along abutting first attachment lines of the cover and the strip, the first attachment line of the cover being disposed transversely with respect to the cover and the first attachment line of the strip extending longitudinally of the strip intermediate its side edges thereby to provide two portions of the strip which extend away from opposite sides of the first attachment line of the strip towards the side edges; securing together the two portions of the strip along second attachment lines of the strip which extend longitudinally of the strip and are spaced from the first attachment line thereof and also from the respective side edges of the strip, thereby to form the strip into a tube between the first and second attachment lines thereof, the tube having two longitudinally extending flaps extending from said second attachment lines to the respective side edges of the strip; and attaching the flaps to the inner face of the lining along third attachment lines of the strip extending longitudinally of the strip adjacent to its side edges, the said tube being formed to receive the cross member whereby both the cover and the lining are connected to the cross member.

2. A method as claimed in claim 1 wherein the said two portions of the strip are secured together along said second attachment lines by stitching.

3. A method as claimed in claim 1 wherein the said flaps of of the strip are attached to the lining along said third attachment lines by stitching.

4. A method as claimed in claim 1 wherein pockets are provided at the sides of the cover to receive the ends of the cross member, the cover having at each side thereof a side portion, which method further includes the steps of turning over the side portion at each side of the cover so that it lies flat against a respective second portion of the cover adjacent to said side portion whereby the cover is provided with a double thickness side margin at said side thereof; attaching a piece of a flexible material that is comprised of a plastics material, to the exposed face of the side portion at each side of the cover by welds which also secure the side portion to the second portion, the said piece of material forming the pocket at said side of the cover; folding over the double thickness side margin at each side of the cover so that it lies flat against a respective third portion of the cover adjacent to the second portion with the pocket at said side between them; and then attaching by welding the second portion at each side of the cover to the adjacent third portion.

5. In a folding roof means for a vehicle having a roof formed with an opening therein, which roof means comprises an outer cover of a flexible sheet material that is comprised of a plastics material, a number of cross members extending beneath and transversely with respect to the cover for supporting the cover, an inner lining of a flexible sheet material which extends beneath the cross members, and means for mounting the roof means on the vehicle with the cross members extending transversely of the opening in the roof thereof and for movement longitudinally of the opening between a position in which the cover and the lining are extended and close the opening, and a position in which the cover and the lining are collapsed so that the opening is open, the improvement comprising a tubular pocket extending transversely with respect to the cover, the cover having an inner surface that is directly attached to the pocket and a flap extending between the pocket and the lining and connecting the lining to the pocket, the pocket and the flap being formed by a strip of a flexible material that is comprised of a plastics material, the strip having side edges, the strip being attached by welding to the cover along abutting first attachment lines of the cover and the strip, the first attachment line of the cover being disposed transversely with respect to the cover and the first attachment line of the strip extending longitudinally of the strip intermediate its side edges whereby the strip has two portions which extend away from opposite sides of the first attachment line of the strip towards the side edges, the two portions of the strip being secured together along second attachment lines of the strip extending longitudinally of the strip and spaced from the first attachment line thereof and also from the respective side edges thereby to form the tubular pocket between the first and the second attachment lines of the strip and the flap being the two sections of the strip extending from the second attachment lines, the lining having an inner face and the flap being attached to the inner face of the lining along third attachment lines of the strip extending longitudinally of the strip adjacent to the side edges; a respective cross member extending through the pocket.

6. A folding roof means as claimed in claim 5 wherein the two portions of the strip which extend from opposite sides of the first attachment line thereof, are secured together along the second attachment lines by stitching.

7. A folding roof means as claimed in claim 5 wherein the portions of the strip which extend from the second attachment lines thereof and form the flap are attached to the lining along the third attachment lines by stitching.

8. A folding roof means as claimed in claim 5 wherein the tubular pocket is open-ended and the ends of the cross member received therein project from the ends of the tubular pocket, and side pockets are provided at the sides of the cover and receive the ends of the cross member whereby the cover is connected at its sides to the ends of the cross member, the cover having at each side thereof a side portion which is turned over so that it lies flat against a second portion of the cover adjacent to said side portion whereby the cover has a double thickness side margin at said side, the side pocket at said side being open-ended and formed of a piece of flexible material that is comprised of a plastics material, said piece of material being attached to the exposed face of said side portion of the cover by two spaced weld lines so that the pocket is defined by the piece of material and the opposed part of said side portion between said weld lines, the latter also securing the side portion to the second portion, and the double thickness side margin of the cover being folded over so that it lies flat against a third portion of the cover adjacent to the second portion with the side pocket being between said third and second portions, and the second portion being attached by welding to the third portion.

* * * * *